INVENTORS
Albert D. Baker
Lloyd E. Muller
Edward P. Harris

Attorney

Jan. 17, 1956   A. D. BAKER ET AL   2,731,104
AIR GRILLE
Filed Oct. 8, 1953   2 Sheets-Sheet 2

INVENTORS
Albert D. Baker
Lloyd E. Muller
Edward P. Harris

*Attorney*

United States Patent Office
2,731,104
Patented Jan. 17, 1956

2,731,104
AIR GRILLE

Albert D. Baker, Lansing, and Lloyd E. Muller, Flint, Mich., and Edward P. Harris, Dayton, Ohio, assignors to General Motors Corporation, Detroit, Mich., a corporation of Delaware Application October 8, 1953, Serial No. 384,984

4 Claims. (Cl. 183—44)

This invention relates to air grilles and more particularly to a molded plastic air grille structure adapted for use in an air circulating system of an automobile.

Our invention consists of an air grille that is mainly adapted for use in an air circulating system, and more particularly an air cooling system, of a modern automobile. It is easily appreciated that an air grille to serve the capacity set forth must fill many requirements not usually contemplated by conventional types of air grilles. Among the needs which this air grille must satisfy are that the grille must be small in size so as to fit within a limited space, it must be relatively unbreakable, and must provide for the continuous circulation of filtered air during the periods when a package or other object is placed on the grille opening so the comfort and safety of the passengers of the automobile is not impaired for want of positive circulation of air.

The grille according to the present invention is particularly adapted to be mounted in a support as the rear shelf of an automobile where it is connected with the duct work of the air circulating system and satisfies all of the requirements set forth.

In the present day air conditioning systems the evaporator and other duct work is located in the trunk compartment of the automobile and has much of its air circulating system accessible therefrom and is arranged to circulate air in the passenger compartment. As shown in the drawings the grille, contemplated by the present invention, is mounted so the grille faces the passenger section and has the duct connecting portion thereof located in the trunk compartment. The grille face is arranged so that the louvers thereof project above the mounting flange which engages the rear shelf. This provides for a plurality of openings between the end portions of the louvers and mounting flange so that a book, package or other article having a flat surface may be placed on top of the grille louvers without completely obstructing the openings through which the return air must flow.

Further it has been found that the use of an air filter is desirable in an air conditioning system of an automobile. It is to be appreciated that these filters require frequent replacing particularly when the automobile travels along dusty roads. To accomplish this replacement the present grille structure provides a space wherein the filter may be received so that it not only filters the air passing therethrough but also provides an additional support for the louvers of the grille face. To aid in the removal of the filter, the aperture through which the filter is inserted into the grille structure is arranged so that it faces the interior of the trunk compartment. With this arrangement the filter may be removed or inserted by merely reaching into the compartment and grasping handles provided on the filter which otherwise cooperate with ribs or other holding means for the grille and withdrawing the filter from its lower clamped supporting position.

It is an object therefore of this invention to provide an improved air grille that is adapted to be mounted into position on the rear shelf of an automobile where it provides for the continuous passage of filtered air therethrough during the periods when the grille face supports and is covered with an article placed thereon.

It is a further object to provide an elastomeric one-piece molded air grille adapted to be mounted in an aperture in a support and to removably carry a filter therein wherein a flanged border positions the grille with respect to the aperture and includes a dependent flange therearound and at right angles thereto for stiffening purposes, said dependent flange including an interned edge and an aperture therethrough for insertion of the filter into the box-like enclosure formed by said dependent flange and its edge in cooperation with the border.

In carrying out the above object it is another object to mold a reinforcing element within the unsupported wall of said dependent flange adjacent said aperture therein.

A still further object is to utilize the filter element per se as a support for the louvers of said air grille whereby said louvers are maintained against substantial distortion.

In carrying out the above object it is a further object of the present invention to provide handles on the filter that cooperate with holding means on the grille so the filter will be held in position in an opening and may be removed therefrom when the handles of the filter are disengaged from the grille structure.

Further objects and advantages of the present invention will be apparent from the following description reference being had to the accompanying drawings wherein a preferred embodiment of the present invention is clearly shown.

In the drawings:

Fig. 1 shows an air grille as mounted on the rear shelf of an automobile.

Fig. 2 in section shows a grille and air filter in position on a shelf of an automobile as accessible from the trunk compartment thereof.

Figure 1:
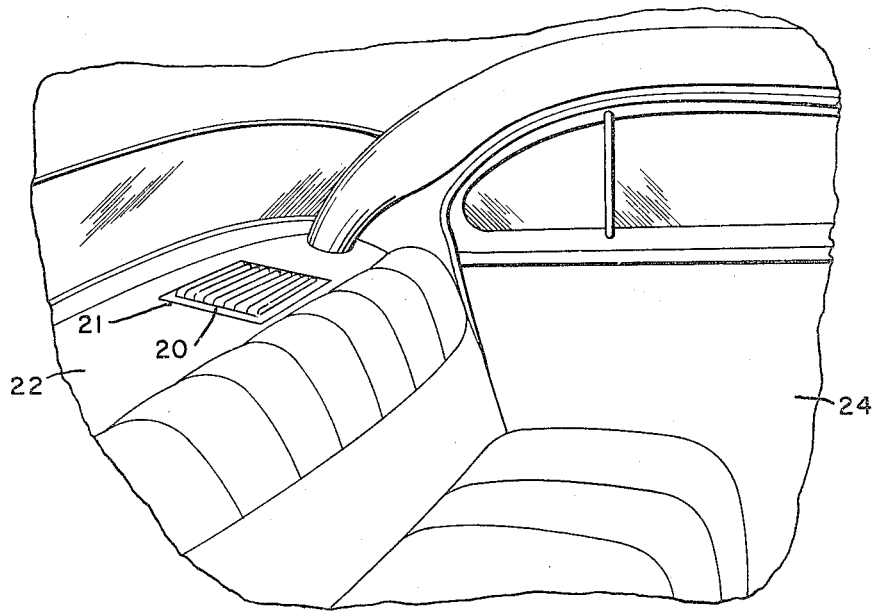

In the drawings, numeral 20 designates a one-piece air grille preferably molded of suitable elastomeric material that is adapted to be mounted in an opening 21 in the rear package shelf 22 of an automobile 24 where it is connected with a duct 23 of an air circulating system, not shown. The grille 20, which is suitably mounted in shelf 22 by bolts or screws 30, comprises a plurality of flanges edgewise attached to one another to form a support for an air filter 43 and a plurality of parallel louvers 34 which form the face of the air grille as clearly shown in the drawings. These flanges include a mounting flange 28, a dependent flange 38, an inturned flange 46 and a second dependent flange 48. The flanges 28 and 38 have the ends of the louvers 34 attached thereto and the second dependent flange 48 is adapted to be connected with the air duct 23.

The bottoms of louvers 34, the walls of dependent flange 38 and the inturned flange 46 cooperate to define a chamber 40 wherein an air filter 43 may be received when the filter 43 is inserted through an aperture 44 formed in dependent flange 38 and leading to chamber 40. Flange 38 when molded has a metal reinforcing member, not shown, therein that imparts additional strength and rigidity thereto for providing additional support to the filter. To aid in the support of louvers 34, filter 43 is provided with a metal frame 47 and a plurality of wires 49 which form an open mesh for its face portions and has an overall size so it simultaneously engages the inturned flange 46 and the bottoms of louvers 34 to provide additional support to the louvers when an article 60 is placed on the top surfaces thereof.

Figure 2:
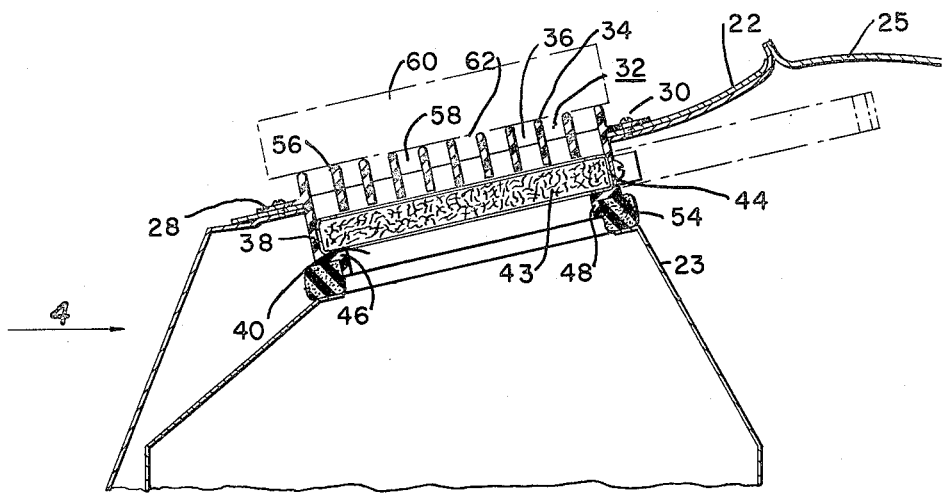
Figure 3:
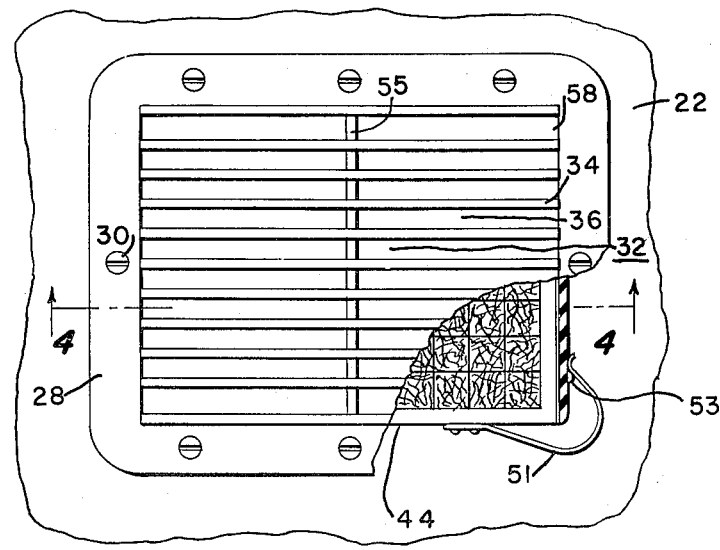
Fig. 3 is a plan view of an air grille with a broken section showing an air filter as held therein.
Figure 4:
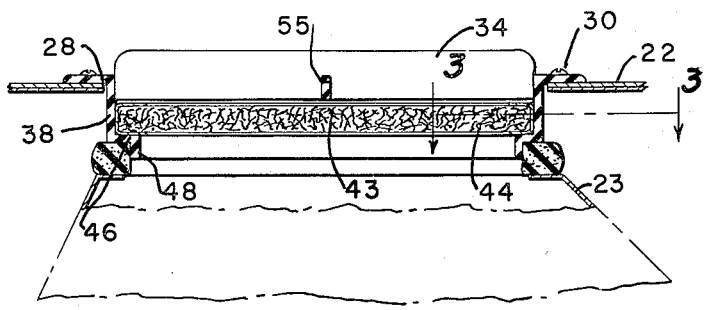
Fig. 4 is a sectional view in a direction of arrow 4 in Fig. 2.
Figure 5:
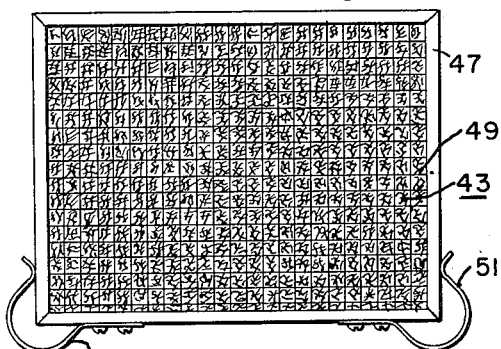
Fig. 5 is a plan view of the filter as used in the above views.

Handle-like clamps 51 attached to the outer frame 47 of filter 43, are adapted to secure the filter 43 in chamber 40 when they engage the rib portions 53 on the outer surface portions of dependent flange 38 and also serve as a grasping means so the filter may be removed or inserted in chamber 40 for cleaning or replacement purposes. The removal of the filter is facilitated when the air grille 20 is located, as in Figure 2, so that the filter receiving opening 44 is within and faces the interior of trunk compartment 25 of the automobile 24 so that the operator can readily reach within the trunk compartment and grasp the handles 51 and withdraw the filter 43 from its secured position within grille 20.

The mounting flange 28 is arranged to define a grille face opening 32 that is divided into a plurality of parallel and equally spaced smaller openings 36 by louvers 34 which are maintained parallel by a support rib 55. These louvers 34 have the ends thereof attached to flanges 28 and 38 so the tops 56 thereof define a plane that projects above a plane defined by the mounting flange 28 to form a plurality of openings 58 between the ends of the louvers 34 and flange 28. These openings 58 will be continuously open during the periods when an article 60 such as a package, book, or other object having a surface 62 complementary in shape to the plate defined by the tops 56 of louvers 34 is placed thereon.

The air grille 20, suitably insulated from air duct 23 by a sealing gasket 54 of any suitable well known material, may be made in a variety of sizes and shapes. It is apparent the form of grille 20 shown in the drawings is for illustration purposes only as circular or other shaped grilles might be formed with curved or flat surfaces or with other than vertical louvers, providing the tops of at least some of the louvers extend above the plane of the mounting flange or support structure surface and the bottoms thereof engage the filter element so as to receive additional support therefrom, so that air may continuously be circulated through the grille when a package is placed thereon.

In the preferred embodiment of the present invention the air grille 20 is molded or otherwise suitably formed from a suitable elastomeric material such as well known organic plastics of the thermosetting or thermoplastic types or natural or synthetic rubbers, such as butadiene styrene copolymers, butadiene acrylonitrile copolymers, chloroprene, etc., or combinations of the above that are suitably compounded and cured so as to produce a structure possessing the desired rigidity and strength for the application involved. Further if desired a metal or other supporting material may be bonded to or molded in the various portions of the grille during the manufacture thereof for increasing the strength of the structure.

While the embodiments of the present invention as herein disclosed, constitutes preferred forms, it is to be understood that other forms might be adopted.

What is claimed is as follows:

1. An air grille adapted to be associated with a support, comprising in combination; a frame-like border flange defining an opening; a filter carried by a portion of said border flange and disposed in a portion of said opening and a plurality of louvers substantially vertical to and carried by said flange and dividing the remainder of said opening into smaller openings, said louvers having top edge portions defining a plane spaced from a plane defined by said flange for providing a plurality of unrestricted openings between ends of said louvers and said flange when an article having a shape complementary to the plane of said louvers engages top portions of said louvers, and having bottom edge portions adapted for engaging a surface of said filter and being supported thereby when said filter is positioned on the portion of the border flange.

2. A molded integral air grille adapted to be received in an opening in a support and providing for circulation of filtered air therethrough, comprising; a border flange forming a frame for an opening, a dependent flange carried by said border flange, an inturned flange carried by said dependent flange defining a portion of a chamber as partially defined by said border flange opening, a second dependent flange carried by said inturned flange defining an opening in said chamber and adapted to be connected with a duct for circulating air through said chamber, a plurality of louvers substantially vertically disposed to said border flange, said louvers having ends thereof carried by said border and first dependent flange and dividing said border opening into smaller openings and having bottom edge portions defining another portion of said chamber and having top edge portions thereof defining a plane spaced from a plane defined by said border flange for providing a plurality of unrestricted openings between ends of said louvers and said flange when an article having a shape complementary to the plane of said louvers engages top portions of said louvers.

3. An air grille adapted for passing filtered air therethrough comprising; a molded structure of elastomeric material adapted to be received in an opening in a support, said structure including; a border flange forming a frame for a rectangular opening; a dependent flange carried by said border flange and bounding rectangular space adjacent to said border flange opening, a second border flange spaced from and parallel to said first mentioned border flange and carried by said dependent flange, a filter supported by said second border flange insertable through an aperture in said dependent flange, a second dependent flange attached to said second border flange adapted to be connected with an air duct having a shape complementary with an opening defined by said second dependent flange, a plurality of relatively thin parallel louvers substantially vertical to said border flange and having end portions attached to said first dependent and border flanges for forming a relatively rigid grille work for said border flange opening when said opening is divided into smaller openings by said louvers, said louvers having top edge portions thereof defining a plane spaced from a plane defined by said border flange for providing a plurality of openings between ends of said louvers and said flange when an article having a shape complementary to the plane of said louvers engages top portions of said louvers and having bottom edge portions defining a plane parallel to said second border flange and disposed beneath said first border flange plane, a chamber defined by the space bounded by said dependent flange, the bottom of said louvers, and said second border flange wherein said filter may be received when said filter is inserted through the aperture in the dependent flange into said chamber wherein the filter is supported by said second border flange and engages bottom portions of said louvers for acting as a support therefor when an article is placed on the tops thereof.

4. In combination with an air grille adapted to be mounted in an apertured support having a plurality of louvers projecting above one surface of the support and having a dependent portion projecting beneath the support adapted to be connected with the duct work of an air circulating system, said dependent portion defining a chamber between the ductwork and the louvers and having an opening in a portion thereof leading into said chamber and a holding surface portion formed thereon adjacent said opening, an air filter comprising; a frame constructed and arranged to pass through said opening into said chamber and adapted to provide a partial support for said louvers, and at least one handle clamp secured to an outer portion of the frame adapted to engage the holding surface portions of said dependent portion for holding said filter in said chamber, said handle clamp being constructed and arranged for effecting disengagement with said holding surface portions and for facilitating the removal of the filter from said chamber.

References Cited in the file of this patent

UNITED STATES PATENTS

| | | |
|---|---|---|
| 693,638 | Breuer | Feb. 18, 1902 |
| 1,113,883 | Delaney | Oct. 13, 1914 |
| 1,911,851 | Scholtz | May 30, 1933 |
| 1,916,907 | Sargent | July 4, 1933 |
| 2,035,097 | Schwartz | Mar. 24, 1936 |
| 2,503,918 | Osborn et al. | Apr. 11, 1950 |

FOREIGN PATENTS

| | | |
|---|---|---|
| 656,550 | France | Jan. 2, 1929 |